US012675358B2

(12) United States Patent　　(10) Patent No.:　US 12,675,358 B2
Shi et al.　　　　　　　　　　　(45) Date of Patent:　　　Jul. 7, 2026

(54) IDENTIFYING ROOT CAUSES OF TEST FAILURES

(71) Applicant: Dell Products L.P., Round Rock, TX (US)

(72) Inventors: Joseph Shi, Shanghai (CN); Xiaowei Shen, Shanghai (CN); Jinghui Zhang, Shanghai (CN); Shuyu Zhao, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/171,506

(22) Filed: Feb. 20, 2023

(65) Prior Publication Data

US 2024/0220403 A1　　Jul. 4, 2024

(30) Foreign Application Priority Data

Dec. 30, 2022　(CN) .......................... 202211742606.3

(51) Int. Cl.
*G06F 11/00*　　　(2006.01)
*G06F 11/07*　　　(2006.01)
*G06F 11/3668*　　(2025.01)

(52) U.S. Cl.
CPC ........ *G06F 11/079* (2013.01); *G06F 11/3684* (2013.01); *G06F 11/3692* (2013.01)

(58) Field of Classification Search
CPC . G06F 11/079; G06F 11/3684; G06F 11/3692
See application file for complete search history.

(56) References Cited

U.S. PATENT DOCUMENTS

| | | | |
|---|---|---|---|
| 2017/0155537 A1* | 6/2017 | Maheshwari | ......... H04L 41/064 |
| 2018/0218264 A1* | 8/2018 | Renders | ................. G06Q 10/20 |
| 2018/0300865 A1* | 10/2018 | Weiss | ............... G05B 19/41875 |
| 2018/0349434 A1* | 12/2018 | Seidel | ................. G06F 16/2365 |
| 2019/0065357 A1* | 2/2019 | Brafman | ............. G06F 11/3664 |
| 2019/0146901 A1* | 5/2019 | Hoover | ................... G06F 16/35 |
| | | | 714/38.1 |
| 2023/0055527 A1* | 2/2023 | Majithia | ............. G06F 11/0772 |

\* cited by examiner

*Primary Examiner* — Joshua P Lottich
(74) *Attorney, Agent, or Firm* — Jackson Walker L.L.P.

(57)　　　　　　ABSTRACT

A disclosed method defines root cause failure categories for a test case and associates each category with a corresponding test configuration property. Test configuration property information, indicative of the test configuration properties, are embedded in test case metadata. After generating test results, including test script messages, the test script messages assessed to identify the "N" most significant keywords in the message. The significance of a term in the test script message may be calculated based on an inverse document frequent parameter, independent of the term frequency within the document. Test result groups may then be determined by invoking a suitable clustering algorithm, e.g., a k-means clustering algorithm, to cluster the test script messages based on their corresponding keyword sets. Hypothesis test statistics may then be calculated for each test result group. A most probable root cause may then be identified for some or all of the test result groups.

14 Claims, 4 Drawing Sheets

100

BEGIN defining root cause categories for test case failures — 102 associating each root cause category with a corresponding configuration property — 104 embedding the test case with metadata indicative of the configuration properties — 106 generating test results by running the test case multiple times across different configuration states — 110 accessing the test results to retrieve test result metadata to determine configuration properties associated with each test run — 111 performing statistical analysis on the test results to identify significant keywords in each error message — 112 identifying two or more failure groups based on similarities in the keyword sets — 114 cluster the error messages based, at least in part, on the keyword strings — 116

END

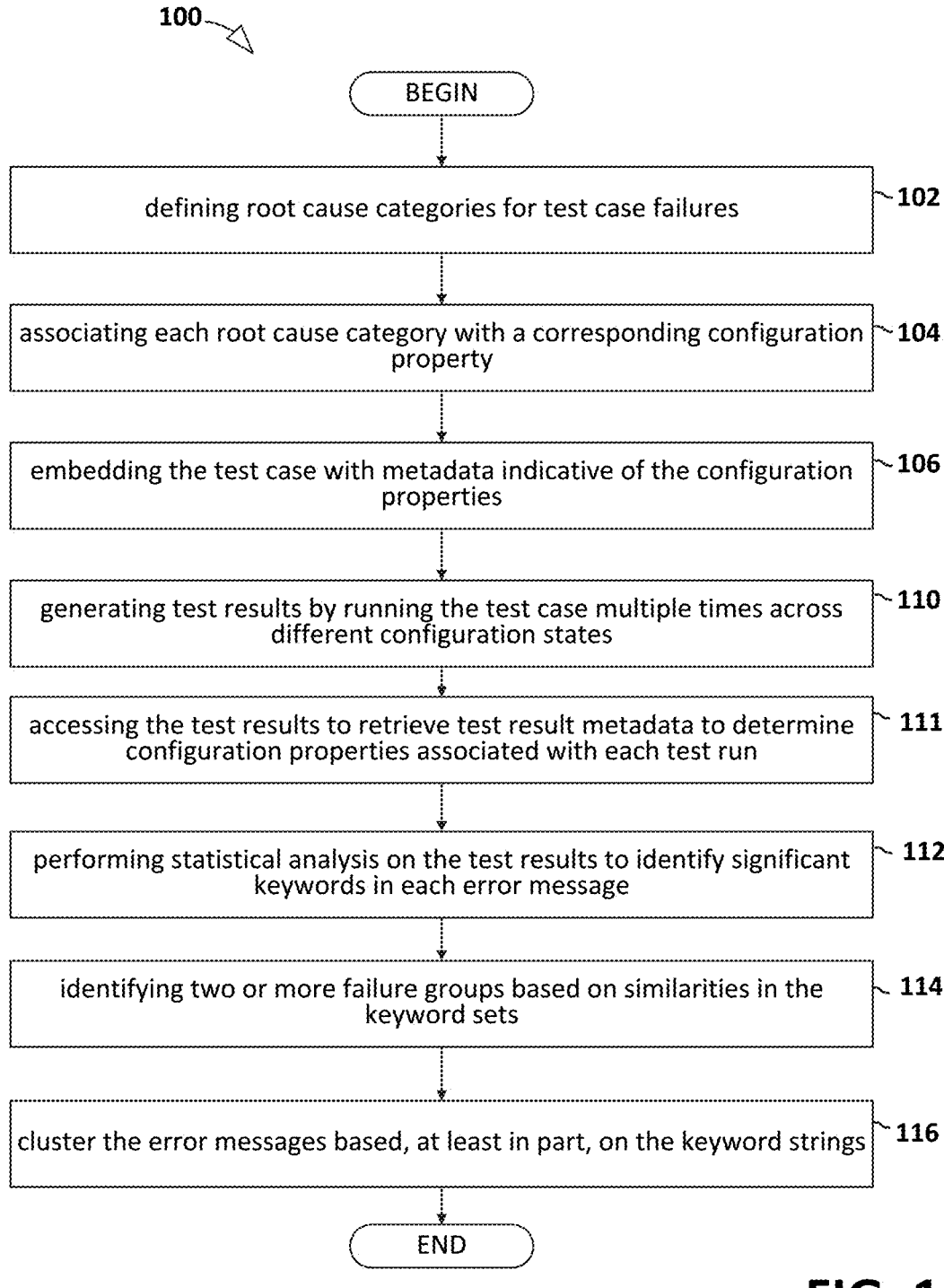

100

BEGIN defining root cause categories for test case failures ~ 102 associating each root cause category with a corresponding configuration property ~ 104 embedding the test case with metadata indicative of the configuration properties ~ 106 generating test results by running the test case multiple times across different configuration states ~ 110 accessing the test results to retrieve test result metadata to determine configuration properties associated with each test run ~ 111 performing statistical analysis on the test results to identify significant keywords in each error message ~ 112 identifying two or more failure groups based on similarities in the keyword sets ~ 114 cluster the error messages based, at least in part, on the keyword strings ~ 116

END

FIG. 1

- Testcase:
  - test_remote_tftp_fwup_for_powersupply   ←— 401

- Testrun's failures have two kinds of script error messages:
  1. AssertionError: Failed to find Power Supply A1 MCU 0x005F0056 image in release package. ←— 402

2. annotation: Wait Power Supply A1 MCU firmware flashing process complete.

404 →

```
   annotation: Wait Power Supply A1 MCU firmware flashing process complete.
   time: 2022-06-16T08:22:20.058719Z. {'detail': {'passed': [{'verify':
   'result.obj.state == "idle"', 'msg': ''}, {'verify':
   'result.obj.redundancy_state in ["idle", "redundancy state synch complete"]',
   'msg': ''}, {'verify': 'result.obj.flashing_status == "no error"', 'msg':
   ''}, {'verify': 'result.obj.flashing_progress == "100 %"', 'msg': ''}],
   'failed': [{'verify': 'result.obj.total_number_of_successful_updates != "0"',
   'msg': ''}, {'verify': 'result.obj.total_number_of_failed_updates == "0"',
   'msg': ''}, {'verify': 'result.obj.total_number_of_skipped_updates == "0"',
   'msg': ''}]}, 'result': False, 'lastupdate': '2022-06-16T08:22:20.124713Z'}
```

FIG. 4

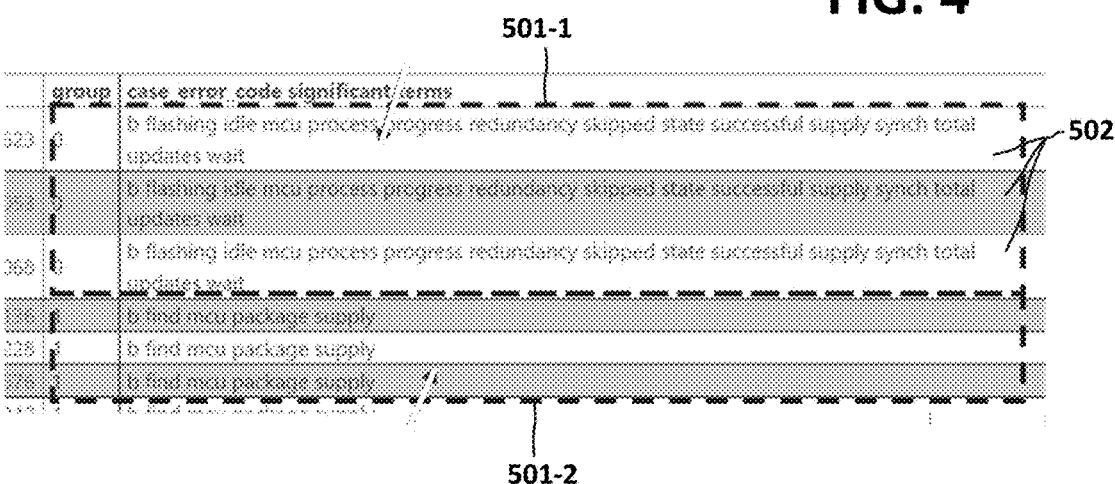

|            | pass | fail | total | fail_rate |
|------------|------|------|-------|-----------|
| testbed    |      |      |       |           |
| fkp1   | 0.0  | 22.0 | 22.0  | 1.00      |
| fkp2       | 21.0 | 2.0  | 23.0  | 0.09      |
| fks1       | 20.0 | 0.0  | 20.0  | 0.00      |
| total      | 41.0 | 24.0 | 65.0  | NaN       |

Explain:
chi_square_sum: 57.159331919406156
dof: 2
alpha: 0.05
p_value: 3.87245790989254e-13          ← 601
influence: True
largest influence name: fkp1

700

|              | pass | fail | total | fail_rate |
|--------------|------|------|-------|-----------|
| release      |      |      |       |           |
| FOR_1741_RC1 | 18.0 | 0.0  | 18.0  | 0.0       |
| FOR_1760_RC1 | 21.0 | 0.0  | 21.0  | 0.0       |
| FOR_1760_RC1 | 1.0 | 9.0 | 10.0 | 0.9     |
| FOR_1760_RC2 | 15.0 | 0.0  | 15.0  | 0.0       |
| total        | 75.0 | 9.0  | 64.0  | NaN       |

Explain:
chi_square_sum: 74.592
dof: 3
alpha: 0.05
p_value: 4.44089208500625e-16          ← 701
influence: True
largest influence name: FOR_1760_RC1

800

IDENTIFYING ROOT CAUSES OF TEST FAILURES

TECHNICAL FIELD

The present disclosure pertains to information handling systems and resources and, more specifically, automated regression testing of software following software changes.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Automated regression testing is a known approach for ensuring that approved software continues to function as expected whenever the software is updated, revised, or otherwise modified. Automated regression testing may be employed following bug fixes, feature enhancements, configuration changes, and/or changes in physical components. In some cases, automated regression testing produces ambiguous test results. For example, a device under test (DUT) may fail a first test run and pass a second test run. If the first and second test runs are executed under conditions that differ in one or more aspects, the root cause of any particular failure may be unclear. More generally, interpreting the results of regression testing that includes a large number of test runs performed on multiple DUTs under circumstances or conditions that vary in one or more parameters, it may be difficult to identify, with sufficient certainty, root causes of failure events. This is particularly true when the test runs produce results that appear to be inconsistent, such as when a DUT fails a first test run for a first reason, but then fails a second test run for a different reason.

SUMMARY

Common problems associated with accurately identifying root causes of test case failures occurring during automated regression testing, or some other suitable type of testing, are addressed by disclosed systems and methods. In at least some embodiments, root causes are determined based primarily or entirely on test script messages generated while running the applicable test case numerous times using numerous different test configurations. Significant keywords may be identified for each test script message corresponding to a test run failure, i.e., a test script error message. The test run failures may then be categorized, based on the identified significant keywords, into test fail groups. Test statistics may be calculated using a statistical hypothesis test such as a chi squared test, across the failure groups and configuration properties. Based on the calculated statistics, disclosed methods and systems may determine most likely root causes for one or more of the test case failures. In at least one embodiment of disclosed systems and methods, a chi-squared test and a chi square statistic may be used identify dependencies between configuration parameters and failure groups.

In at least one aspect, disclosed methods and systems may define one or more root cause failure categories for a test case and associate each root cause failure category with a corresponding test configuration property. Exemplary root cause failure categories may include a firmware issue category, a testbed issue category, and a test script issue category. Exemplary test configuration properties may include a firmware version, indicative of a version of firmware stored in a device under test (DUT), a testbed identifier (ID), and a test case script version.

Test configuration property information indicative of one or more of the test configuration parameters, may be embedded in test case metadata. After generating test results including test script messages, the test script messages may be accessed to identify a keyword set, comprising the "N" most significant keywords in the applicable test script message, for some or all of the test script messages, where N is an integer greater than 1 and less than 10 in at least some embodiments and less than 5 in at least some embodiment. The test script messages may include assertion messages, annotation messages, or another suitable type of message. The significance of a term in the test script message may be calculated based on an inverse document frequent parameter. In at least one embodiment, the significant of a term is independent of the term frequency within the document. In such embodiments, the significance of a term is based on the inverse document frequency, but not the term frequency.

Test result groups may then be determined by invoking a suitable clustering algorithm, e.g., a k-means clustering algorithm, to cluster the test script messages based on their corresponding keyword sets. Hypothesis test statistics may then be calculated for each test result group. In at least one embodiment, chi squared statistics are calculated across each configuration property in each of the test result groups. A most probable root cause may then be identified for some or all of the test result groups.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates a flow diagram of a method for identifying root causes of test cases failures in accordance with subject matter disclosed herein;

FIG. 4 illustrates an exemplary test case and exemplary types of test script messages for the test case;

FIG. 5 illustrates exemplary test result groups generated by clustering of keyword sets for test script messages;

DETAILED DESCRIPTION

Figure 2:
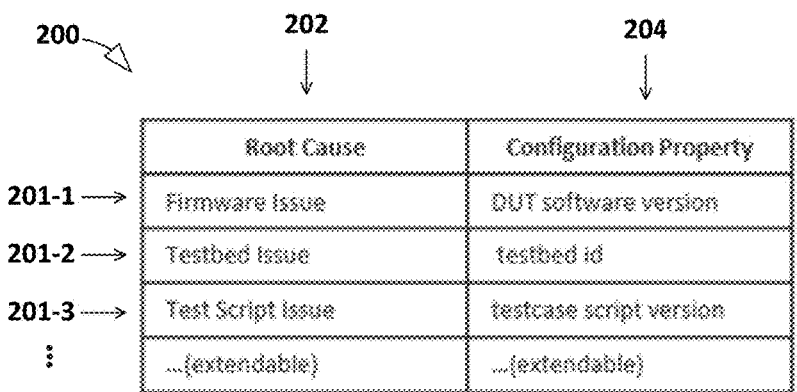
FIG. 2 illustrates a table of root cause failure categories and a corresponding test configuration property for each root cause failure category.

Exemplary embodiments and their advantages are best understood by reference to FIGS. 1-8, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 is a flow diagram of a method 100 for identifying root causes of test case failures. Test cases may be run as part of an automated regression testing performed following an update or modification of software including, but not limited to, firmware for an information handling system or a component of the information handling system. The method 100 illustrated in FIG. 1 begins by defining (step 102) a set of root cause categories for test case failures that have and/or might be expected to occur while executing a test case. As an illustrative example, a test case may be performed by coupling a DUT, programmed with a particular version of firmware, to a particular testbed, and executing a particular test script intended to: (1) cause the DUT to execute the firmware and (2) produce a test result indicative whether the test run passed or failed. If the test run fails, the test result would include one or more test script error messages indicative of events, states, or other information encountered during execution of the test case. If, in this example, the firmware version of the DUT, the testbed on which the DUT was tested, and the test script version may each vary from one test run to the next, root cause categories for this exemplary test case might include a firmware issue, a testbed issue, and a test script issue.

The method 100 illustrated in FIG. 1 further includes associating (step 104) each root cause category with a configuration property. Returning to the exemplary test case described above, the test case may be characterized as having a configuration state defined by three configuration properties including a first configuration property indicative of the firmware version, a second configuration property indicative of the specific testbed, and a third configuration property indicative of the test script version. In this example, step 104 of the method 100 illustrated in FIG. 1 may include associating the first root cause category (firmware issue) with the first configuration property (firmware version), associating the second root cause category (testbed issue) with the second configuration property (testbed ID), and associating the third root cause category (test script issue) with a third configuration property (test case script version).

The association of root cause categories and test case configuration properties is represented in table 200 of FIG. 2, wherein each root cause category 202 is associated with a corresponding configuration property 204. In this manner, table 200 defines a set of cause-configuration pairs 201-1 through 201-3 wherein each cause-configuration pair 201 includes a root cause category and its corresponding configuration property.

Returning to FIG. 1, the illustrated method 100 includes embedding (step 106) the test case with metadata indicative of the configuration properties to enable test scripts to generate test script error messages that convey the configuration state of the failing test run by indicating the applicable set of configuration property values. Method 100 may then generate test results (step 110) by running the test case multiple times across different configuration states, i.e., different combinations of configuration property values. The test results may include test script messages indicative of whether the test run passed or failed and conveying the applicable metadata. After generating test results, method 100 may access the test results to retrieve (step 111) test result metadata to determine the configuration properties associated with each test run.

The method 100 depicted in FIG. 1 may then perform a statistical analysis on the test results to identify (step 112) significant keywords in each test script error message. Keyword significance, i.e., the significance of a word within a document in a corpus of documents, is often calculated or otherwise evaluated based at least in part on a term frequency—inverse document frequency (tf-idf) statistic. As suggested by its name, a td-idf statistic is influenced by tf, the relative frequency of a term within a document, and idf, which conveys a uniqueness of the word within the applicable document corpus, i.e., how common or rare the word is with respect to the documents in the document corpus. In at least one embodiment of method 100, however, keyword significance is determined based solely on an idf parameter. In an exemplary embodiment, keyword significance is determined based on whether an idf of a word or term is equal to $1/M$, where M is the total number of test script error messages that contain the keyword. Calculating keyword significance based solely on an idf parameter beneficially improves the ability to detect tiny differences between two or more test script error messages generated by a single test script. In at least some embodiments, step 112 may include identifying a keyword set for each failed test run, wherein each keyword set includes the "n" most significant keywords where n is a small, positive integer greater than 1. For example, in some embodiments, $1<n<10$, while in some other embodiments, $1<n<5$.

Method 100 may then identify (operation 114) two or more test result groups based on the keyword sets. In at least one embodiment, method 100 applies a k-means clustering algorithm to the keyword sets to identify the test result groups.

With the test result groups defined, the illustrated method 100 may then assess (step 116) configuration property dependencies within each test result group to identify a root cause for the test result group. In an exemplary embodiment, method 100 calculates chi square statistics for each configuration property within each test result group to identify configuration properties exhibiting high dependencies. A configuration property exhibiting a high dependency may then be identified as a most likely root cause for the corresponding test result group.

The illustrated method 100 thus precisely classifies multiple root causes in automation regression test by extracting significant keywords from script error messages, clustering the extracted keywords into test result groups, and using chi square statistics to identify a most likely root cause for at least some of the test result groups.

The use of configuration property metadata that is directly aligned with root cause failures enables the illustrated method to employ a statistical model rather than semantical classification to group test case failure root causes. Because conventional test script error messages generally describe DUT behavior phenomenon, those error messages may not be suitable for identifying root causes associated with test case configuration parameters. To illustrate, a test script may generate a message such as "Sending IPMI command to host 192.168.0.1 timed out." A semantic analysis of this message might well conclude that the message is most likely attributable to a network issue when, in fact, the error message may be attributable to a configuration property.

Figure 3:
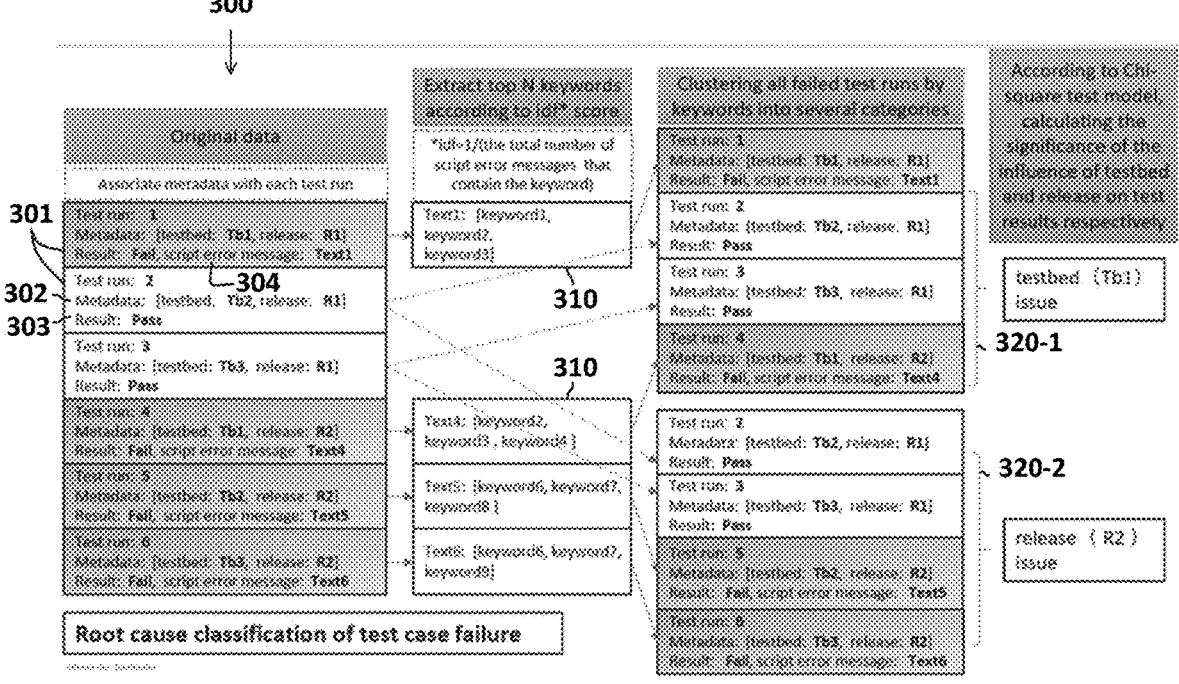
FIG. 3 illustrates a graphical representation of processing test script messages in accordance with disclosed subject matter.

FIG. 3 graphically illustrates an exemplary methodology for processing and analyzing test script messages using statistical tools including keyword significance, clustering, and chi square statistics. As depicted in FIG. 3, original data 300 includes a plurality of test results 301 generated during automated regression testing. Each test result 301 includes metadata 302, indicative of test case configuration properties, and a result parameter 303 indicating whether the applicable test run passed or failed. In addition, each test result 301 corresponding to a failed test includes a test script error message 304.

As depicted in FIG. 3, test script error messages 304 are evaluated to identify a keyword set 310 for each test script error message. Each keyword set 310 includes the "n" most significant keywords in the corresponding test script error messages, where the value of "n" depicted in FIG. 3 is three. As described previously, keyword significance in this context may be determined based solely on an idf metric, unlike many conventional methods for assessing keyword significance, wherein significance is influenced by a tf metric as well as an idf metric. The keyword sets 310 are then clustered into one or more test result groups 320, two of which are illustrated in FIG. 3 as test result groups 320-1 and 320-2. As depicted in FIG. 3, test results 301 that pass are included in each test result group to provide a basis for evaluating configuration parameter dependencies. FIG. 3 further illustrates the use of chi square statistics to evaluate dependencies associated with the applicable configuration parameters. In FIG. 3, the configuration properties include the testbed identification and the firmware release, but those of ordinary skill will readily appreciate that other configuration properties may be include or substituted.

FIG. 4 illustrates an exemplary test case 401 and two types of script error messages that test case 401 might generate. The first type of script error message 402 is an assertion-type script error message while the second type of script error message 404 is an annotation type script error message. Assertion messages and annotation messages will be well known to those of ordinary skill in the general purpose programming languages including, as a non-limiting example, Python programming language. FIG. 5 illustrates exemplary test result groups 501-1 and 501-2 generated by clustering test script messages based on keyword sets 502 calculated, determined, or otherwise identified for each test script message. FIG. 5 reveals similarities in the keyword sets 502 within each test result group 501.

Figure 6:
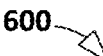
FIGS. 6 and 7 illustrate exemplary chi-squared statistics generated for a two different test result groups.
Figure 7:
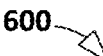

FIG. 6 and FIG. 7 illustrates exemplary chi-squared contingency tables 600 and 700 corresponding to two different test result groups for an exemplary test case in which the test configuration properties include a testbed property and a firmware release property. As described in the preceding text, each test result group is determined by clustering test script messages based on the most significant keywords in each test script message. Contingency table 600 corresponds to a chi-squared test of the testbed configuration property for a particular value of the firmware release property. As depicted in FIG. 6, contingency table 600 and the corresponding chi-squared statistics 601 for contingency table 600 reveal that the test script messages in this test result group reflect a testbed issue, i.e., a high dependency on the testbed id. Specifically, contingency table 600 suggests that testbed 'fkp1' is the root cause of failures in the applicable test group due the fail rate of fkp1 being significantly higher than the fail rate of other test beds and this suggestion is supported by the statistics 601 wherein the p-value of 3.87E-13 is significant at the 95% confidence level. Similarly, contingency table 700, which illustrates chi-square test based on the firmware release property indicate that the firmware release FOR_1760_RC1 a statistically significant higher fail rate than the other three releases and the test statistics 701 confirm that the suspected firmware release is the most probably root cause for failure in the applicable test group at the 95% confidence level. In the scenario represented by FIG. 6 and FIG. 7, the test result group corresponding to contingency table 700 is able to expose the faulty firmware because the failures attributable to the testbed issue have been effectively segregated into their own test result group.

Figure 8:
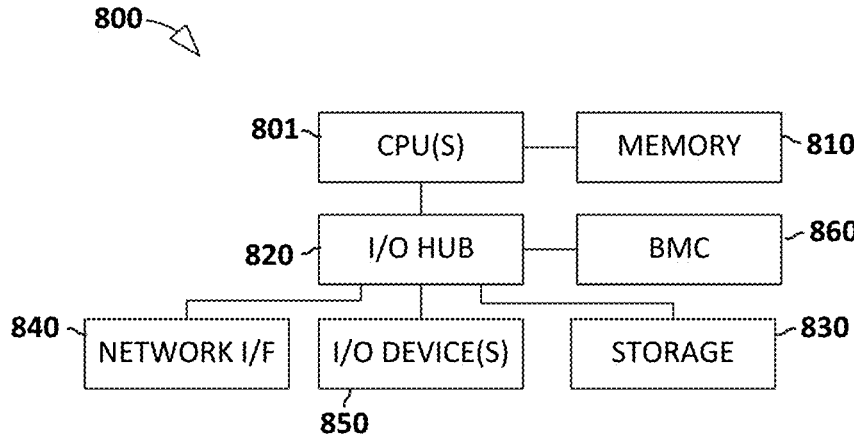
FIG. 8 illustrates an exemplary information handling system suitable for use in conjunction with the method illustrated in FIG. 1.

Referring now to FIG. 8, any one or more of the elements illustrated in FIG. 1 through FIG. 7 may be implemented as or within an information handling system exemplified by the information handling system 800 illustrated in FIG. 8. The illustrated information handling system includes one or more general purpose processors or central processing units (CPUs) 801 communicatively coupled to a memory resource 810 and to an input/output hub 820 to which various I/O resources and/or components are communicatively coupled. The I/O resources explicitly depicted in FIG. 8 include a network interface 840, commonly referred to as a NIC (network interface card), storage resources 830, and additional I/O devices, components, or resources 850 including as non-limiting examples, keyboards, mice, displays, printers, speakers, microphones, etc. The illustrated information handling system 800 includes a baseboard management controller (BMC) 860 providing, among other features and services, an out-of-band management resource which may be coupled to a management server (not depicted). In at least some embodiments, BMC 860 may manage information handling system 800 even when information handling system 800 is powered off or powered to a standby state. BMC 860 may include a processor, memory, an out-of-band network interface separate from and physically isolated from an in-band network interface of information handling system 800, and/or other embedded information handling resources. In certain embodiments, BMC 860 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A computer-implemented method executed by one or more processors coupled to a memory, the method comprising:

responsive to completion of a firmware update of an information handling system, initiating automated regression testing by running a plurality of test cases across a plurality of test configurations and detecting one or more test case failures corresponding to a particular test case, the test cases being instrumented to generate test result metadata indicative of configuration properties for each run;

defining, in the memory, a set of root cause failure categories for the particular test case and storing a table that associates each root cause failure category with a corresponding test configuration property, the table comprising cause-configuration pairs that align root cause categories with respective configuration properties;

embedding, at test execution time, configuration property information in test case metadata such that each test result includes values for the associated configuration properties;

accessing, from the memory, test script error messages included in the test results and, for each failed run, generating a keyword set that includes N most significant keywords for the corresponding test script error message, the significance of each keyword being computed based solely on an inverse document frequency parameter that is independent of term frequency within the message;

forming, for each failed run, an N-dimensional vector representation of its keyword set and clustering the failed runs by applying a k-means clustering algorithm to the vector representations to produce two or more test result groups, and for each test result group including corresponding passed runs to enable statistical dependency evaluation;

for each test result group, constructing, in the memory, a contingency table between configuration property values from the embedded metadata and pass/fail counts for runs in the group, and computing a chi-squared statistic and corresponding p-value for each configuration property;

automatically identifying, by the one or more processors, a most probable root cause for the particular test case by selecting, for at least one test result group, the root cause failure category associated with the configuration property whose chi-squared test exhibits statistical significance at a confidence level of at least 95%; and storing, in the memory, an electronic record that maps the test result group to the identified most probable root cause together with the corresponding configuration property and p-value, for use in subsequent troubleshooting of the information handling system.

2. The method of claim 1, wherein each test script error message to a corresponding one of the test case failures.

3. The method of claim 1, wherein the root cause categories include any one or more of: firmware issue, testbed issue, and test script issue.

4. The method of claim 1 wherein the test configuration properties include any one or more of: a firmware version, indicative of a version of firmware stored in a device under test (DUT), a testbed identifier (ID), and a test case script version.

5. The method of claim 1, wherein the test script error include at least one of: one or more assertion messages and one or more annotation messages.

6. The method of claim 1, wherein N is an integer greater than or equal to 3 and less than 5.

7. The method of claim 1, wherein calculating hypothesis test statistics for two or more test result groups comprises calculating a chi square statistic for each test result group and each configuration property.

8. An information handling system, comprising:

a central processing unit (CPU); and a non-transitory computer readable medium including processor-executable instructions that, when executed by the CPU, cause the information handling system to perform operations comprising:

responsive to completion of a firmware update of an information handling system, initiating automated regression testing by running a plurality of test cases across a plurality of test configurations and detecting one or more test case failures corresponding to a particular test case, the test cases being instrumented to generate test result metadata indicative of configuration properties for each run;

defining, in the memory, a set of root cause failure categories for the particular test case and storing a table that associates each root cause failure category with a corresponding test configuration property, the table comprising cause-configuration pairs that align root cause categories with respective configuration properties;

embedding, at test execution time, configuration property information in test case metadata such that each test result includes values for the associated configuration properties;

accessing, from the memory, test script error messages included in the test results and, for each failed run, generating a keyword set that includes N most significant keywords for the corresponding test script error message, the significance of each keyword being computed based solely on an inverse document frequency parameter that is independent of term frequency within the message;

forming, for each failed run, an N-dimensional vector representation of its keyword set and clustering the failed runs by applying a k-means clustering algorithm to the vector representations to produce two or more test result groups, and for each test result group including corresponding passed runs to enable statistical dependency evaluation;

for each test result group, constructing, in the memory, a contingency table between configuration property values from the embedded metadata and pass/fail counts for runs in the group, and computing a chi-squared statistic and corresponding p-value for each configuration property;

automatically identifying, by the one or more processors, a most probable root cause for the particular test case by selecting, for at least one test result group, the root cause failure category associated with the configuration property whose chi-squared test exhibits statistical significance at a confidence level of at least 95%; and storing, in the memory, an electronic record that maps the test result group to the identified most probable root cause together with the corresponding configuration property and p-value, for use in subsequent troubleshooting of the information handling system.

9. The information handling system of claim 8, wherein each test script error message to a corresponding one of the test case failures.

10. The information handling system of claim 8, wherein the root cause categories include any one or more of: firmware issue, testbed issue, and test script issue.

11. The information handling system of claim 10, wherein the test configuration properties include any one or more of: a firmware version, indicative of a version of firmware stored in a device under test (DUT), a testbed identifier (ID), and a test case script version.

12. The information handling system of claim 8, wherein the test script error messages include at least one of: one or more assertion messages and one or more annotation messages.

13. The information handling system of claim 8, wherein identifying a keyword set for a test script error message comprises identifying the N most significant words in the test script error message, wherein N is an integer greater than or equal to 3 and less than 5.

14. The information handling system of claim 8, wherein calculating hypothesis test statistics for two or more test result groups comprises calculating a chi square statistic for each test result group and each configuration property.

* * * * *